(12) United States Patent
Ishii et al.

(10) Patent No.: US 8,628,637 B2
(45) Date of Patent: Jan. 14, 2014

(54) DISPLAY DEVICE WITH FRONT WINDOW AND MANUFACTURING METHOD THEREOF

(75) Inventors: Akira Ishii, Mobara (JP); Risa Takahashi, Mobara (JP); Hitoshi Ishii, Mobara (JP); Shigemi Shito, Chosei (JP); Shuji Iwasaki, Chosei (JP); Katsuhiko Ishii, Chosei (JP)

(73) Assignees: Japan Display Inc, Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 123 days.

(21) Appl. No.: 13/004,051

(22) Filed: Jan. 11, 2011

(65) Prior Publication Data
US 2011/0177261 A1    Jul. 21, 2011

(30) Foreign Application Priority Data
Jan. 15, 2010    (JP) .................................. 2010-007065

(51) Int. Cl.
*B32B 37/14*    (2006.01)

(52) U.S. Cl.
USPC ..................................................... 156/272.2

(58) Field of Classification Search
USPC .......................................... 156/272.2, 273.5
See application file for complete search history.

(56) References Cited

U.S. PATENT DOCUMENTS

| 4,923,552 A | * | 5/1990 | Fukushima et al. | ........ 156/273.7 |
| 2004/0114095 A1 | * | 6/2004 | Lee et al. | ...................... 349/187 |
| 2008/0153377 A1 | | 6/2008 | Kobayashi et al. | |

FOREIGN PATENT DOCUMENTS

| JP | 2004131341 A | * | 4/2004 |
| JP | 2008-145461 | | 6/2008 |
| JP | 2008-158251 | | 7/2008 |
| JP | 2009-109855 | | 5/2009 |
| JP | 2009109855 A | * | 5/2009 |
| KR | 10-2009-0128165 | | 12/2009 |

* cited by examiner

*Primary Examiner* — Daniel McNally
(74) *Attorney, Agent, or Firm* — Antonelli, Terry, Stout & Kraus, LLP.

(57) ABSTRACT

A distance between a liquid crystal display panel set on a lower support mechanism and a front window set on an upper support mechanism is accurately determined by a stopper. An ultraviolet irradiation mask is provided on the front window. A part of the ultraviolet curable resin corresponding to a transmission pattern of the ultraviolet irradiation mask is temporarily cured through ultraviolet irradiation. The temporarily adhered structure of the liquid crystal display panel and the front window is taken from an attachment device to be left standing for a predetermined time period on a tray until an area and a thickness of the ultraviolet curable resin reach respective predetermined values. The ultraviolet light is then irradiated to an entire surface of the ultraviolet curable resin to finalize the adhesion. The time for which the attachment device is occupied is short, thus improving an operation rate of the device.

8 Claims, 9 Drawing Sheets

DISPLAY DEVICE WITH FRONT WINDOW AND MANUFACTURING METHOD THEREOF

BACKGROUND OF THE INVENTION

Field of the Invention

The present invention relates to a display device with a front window and a manufacturing method thereof, and more particularly, to a process of adhering a front window to a front surface of a display panel so as to be protected.

There has been an increasing demand for the display device such as a liquid crystal display device to reduce the outer dimension of the set and thickness of the display panel as well while keeping a certain size of the screen. After manufacturing of the liquid crystal display panel, its thickness is reduced by grinding the outer portion.

In contrast, however, the reduced thickness of the liquid crystal display panel may result in the problem of mechanical strength. Upon reception of the mechanical pressure to the display surface, a liquid crystal display panel 10 may have a risk of destruction. When the liquid crystal display panel 10 is assembled with the set such as the mobile phone, a front window 20 is attached to the screen of the liquid crystal display panel 10 as shown in FIGS. 23 and 24 for preventing the destruction.

Figure 23:
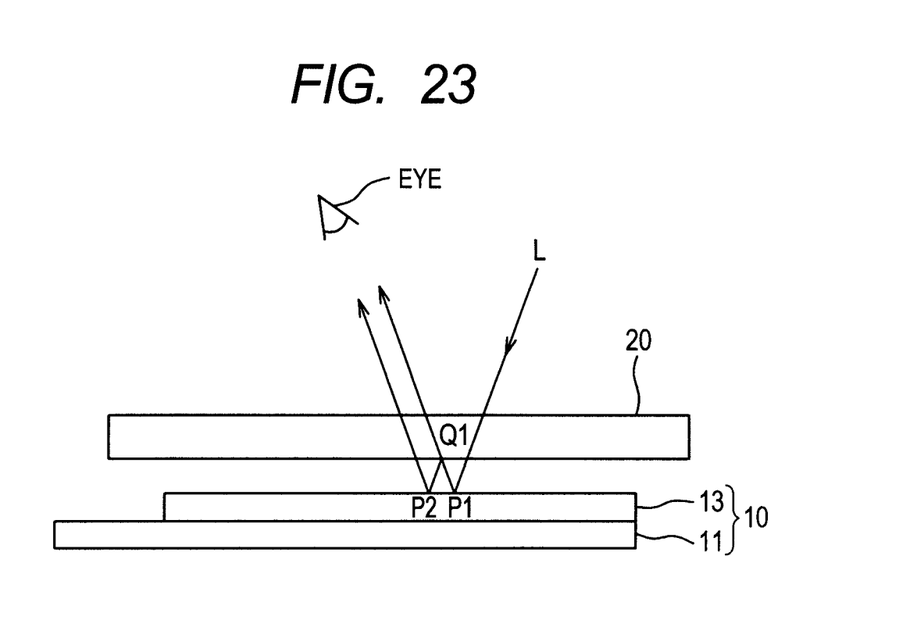
FIG. 23 is a schematic sectional view representing a disadvantageous point of related art.
Figure 24:
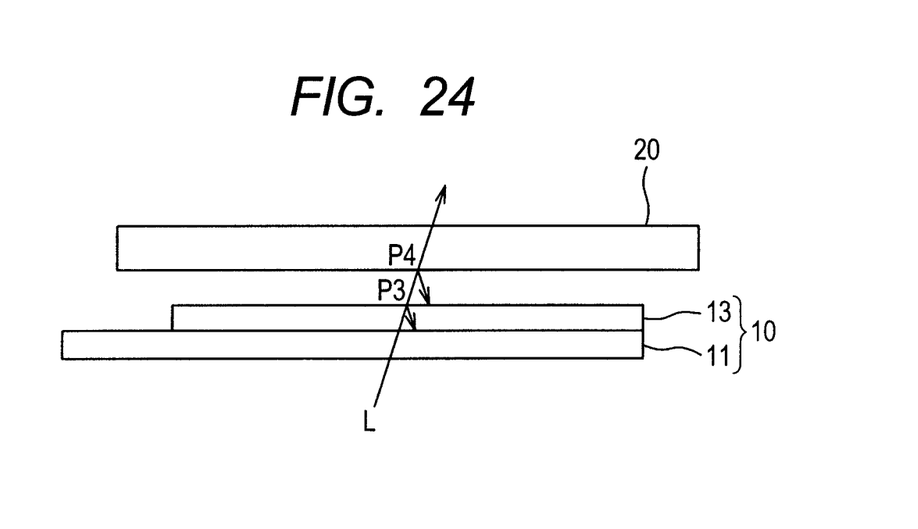
FIG. 24 is a schematic sectional view representing another disadvantageous point of related art.

In the example shown in FIGS. 23 and 24, the front window 20 is provided apart from the liquid crystal display panel 10 so as not to be influenced by the external force which has been exerted to the front window 20. The aforementioned structure may cause the problem as described below. FIG. 23 shows the problem of a doubly contoured image. FIG. 23 represents the problem in the case of the reflection type liquid crystal display panel. Referring to FIG. 23, external light L is injected to transmit the front window 20, and reflects at the liquid crystal display panel 10 to transmit the front window 20 again so as to be caught by eyes of a human. The drawing of FIG. 23 is made without considering refraction of the external light L at the front window 20.

The light reflecting at a screen P1 of the liquid crystal display panel 10 partially reflects at a lower surface Q1 of the front window 20. It is injected to a screen P2 of the liquid crystal display panel 10 and reflects. When eyes of the human visually contact the light reflecting at the screen P2, the resultant image looks doubly contoured. FIG. 23 represents an example using the liquid crystal display panel 10 of reflection type. However, the use of transmission type will result in the same phenomenon. In the case of the transmission type, when the light transmits the liquid crystal display panel 10 at the same angle as the light reflecting at the screen P1 on the liquid crystal display panel 10, the light further reflects at the lower surface Q1 of the front window 20 and follows the same path as that of the reflection type. Such phenomenon as the doubly contoured image may deteriorate image quality.

FIG. 24 represents another problem of the related art. Referring to FIG. 24, the light L from the backlight partially reflects at the interface between an opposing substrate 13 of the liquid crystal display panel 10 and air owing to different refractive index. When the light L is injected to the front window 20 from airspace, it partially reflects owing to the different refractive index. The aforementioned phenomenon may deteriorate the screen brightness.

JP-A No. 2008-158251 discloses the use of the adhesive material with the refractive index similar to that of glass between the front window 20 and the liquid crystal display panel 10 so as to prevent reflection at the interface.

In JP-A No. 2008-158251, an ultraviolet curable resin is used for adhering the front window and the liquid crystal display panel. They are attached in the reduced pressure atmosphere, and in this state, the adhesive material is cured by ultraviolet light so as to prevent generation of bubbles in the ultraviolet curable resin.

In JP-A No. 2008-158251, the adhering process has to be performed in the reduced pressure atmosphere, which increases the device cost. The exhaust process is necessary for realizing the reduced pressure atmosphere. In the reduced pressure atmosphere, the time for the adhesive material to be uniformly distributed is indispensable, thus decreasing throughput.

Meanwhile, there may be a case where the liquid crystal display panel is attached to a touch panel formed by interposing the wiring between two substrates rather than the front window formed of a glass plate or a plastic plate. In such a case, the touch panel may be expanded owing to its internal pressure in the reduced pressure atmosphere. The aforementioned phenomenon may cause difficulty in accurate attachment of those elements.

SUMMARY OF THE INVENTION

The present invention solves the above problems of the related art. The present invention allows the liquid crystal display panel to be adhered to the front window, the touch panel and the like in the atmospheric pressure. The ultraviolet curable resin is used for adhering the front window and the liquid crystal display panel. When curing the resin using the ultraviolet light, the first ultraviolet irradiation in an attachment device that controls the distance between the liquid crystal display panel and the front window or the touch panel serves to temporarily cure the ultraviolet curable resin. The first ultraviolet irradiation is applied only to a part of the ultraviolet curable resin using an ultraviolet irradiation mask. The masked part of the ultraviolet curable resin is not cured, and accordingly exhibits flowability.

The combined structure of the front window and the liquid crystal display panel having the ultraviolet curable resin kept temporarily cured is taken from the attachment device, and left standing in the atmosphere until area and thickness of the ultraviolet curable resin between the front window and the liquid crystal display panel become respective predetermined values. Then the second ultraviolet irradiation is applied to cure the ultraviolet curable resin completely to finish adhesion of the liquid crystal display panel and the front window.

The liquid crystal display panel and the front window may be adhered in the atmosphere. The attachment device temporarily cures a part of the ultraviolet curable resin, and then the combined structure of the temporarily adhered front window and the liquid crystal display panel is left standing for a predetermined time period. Since the time taken for each liquid crystal display device to occupy the attachment device is short, an operation rate of the device may be increased.

After temporarily adhering the liquid crystal display panel and the front window, they are left standing for a predetermined time period while keeping flowability of the ultraviolet curable resin except the temporarily cured portion. This makes it possible to accurately set the thickness and the area of the ultraviolet curable resin. Assuming that bubbles are generated during attachment of the liquid crystal display panel and the front window, they may be discharged outside.

DESCRIPTION OF THE PREFERRED EMBODIMENTS

The present invention will be disclosed in detail in reference to embodiments.

[First Embodiment]

Figure 1:
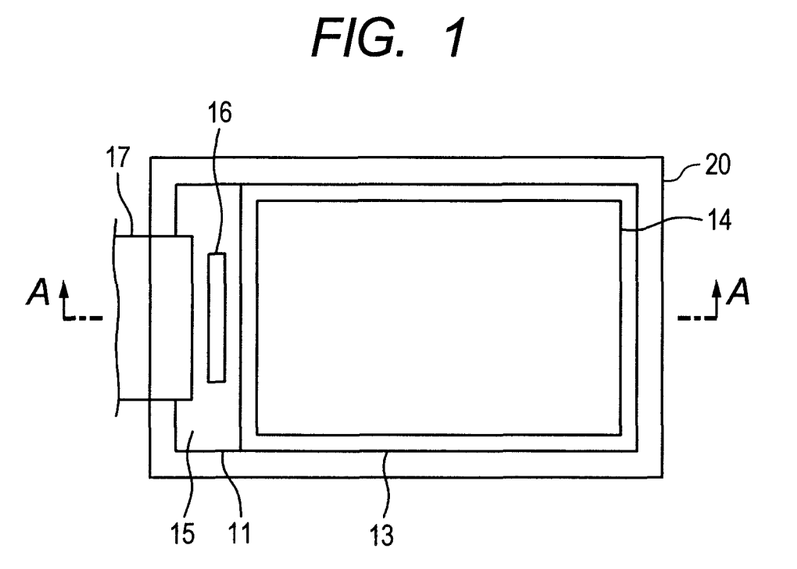
FIG. 1 is a plan view of a liquid crystal display device according to a first embodiment.
Figure 2:
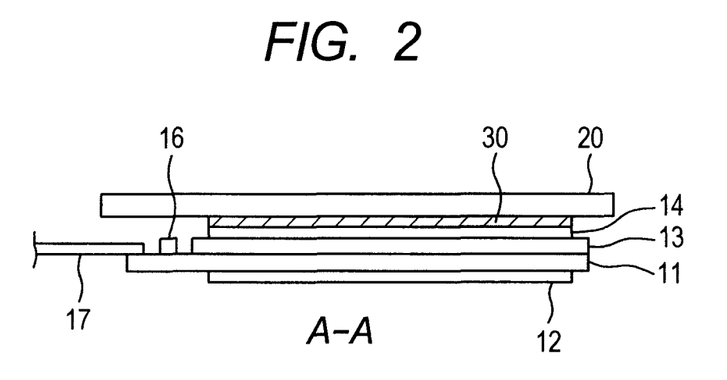
FIG. 2 is a sectional view taken along line A-A of FIG. 1.

FIG. 1 illustrates a display device with a front window which is formed according to a first embodiment of the present invention. More particularly, it is a plan view of a liquid crystal display device with a front window. FIG. 2 is a sectional view taken along line A-A of FIG. 1. Referring to FIGS. 1 and 2, the liquid crystal display device with a front window has a front window 20 adhered to a liquid crystal display panel 10. In the specification, the liquid crystal display panel 10 is formed by adhering a TFT substrate 11 to an opposing substrate 13, attaching a lower polarizing plate 12 to the TFT substrate 11, attaching an upper polarizing plate 14 to the opposing substrate 13, mounting an IC driver 16 on a terminal portion 15, and further connecting a flexible wiring substrate 17 thereto. A liquid crystal module is formed by installing a driver IC as a drive circuit in the liquid crystal display panel 10, combining a backlight therewith, and combining a touch panel to be described later therewith. The liquid crystal display device with a front window is formed by additionally attaching the front window 20 and the like to the liquid crystal display panel or the liquid crystal display module. Referring to FIGS. 1 and 2, the front window 20 is adhered to the liquid crystal display panel 10 via an ultraviolet curable resin 30. An organic EL display device with a front window or a display device with a front window is formed by additionally attaching the front window 20 and the like to a display panel such as an organic EL panel, or a display module such as an organic EL display module having a semiconductor device as a drive circuit installed in the display panel such as the organic EL panel.

Figure 3:
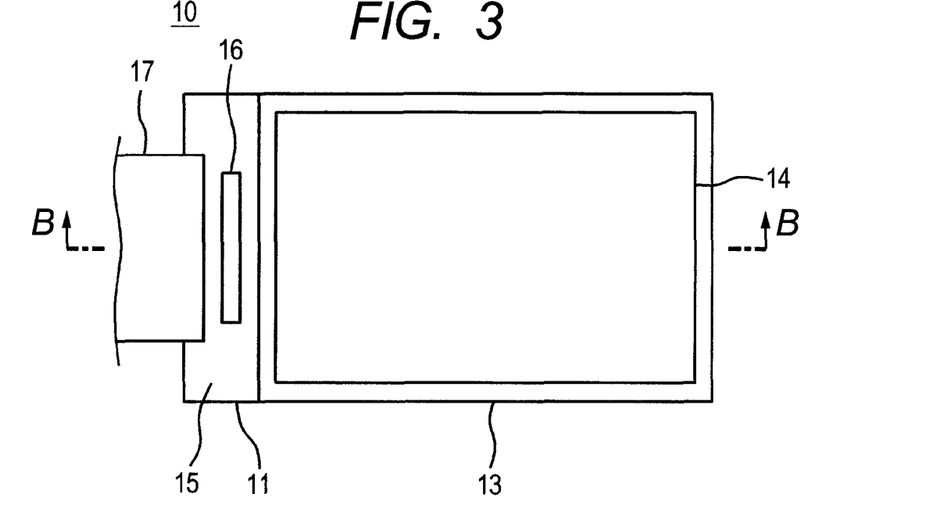
FIG. 3 is a plan view of a liquid crystal display panel.
Figure 4:
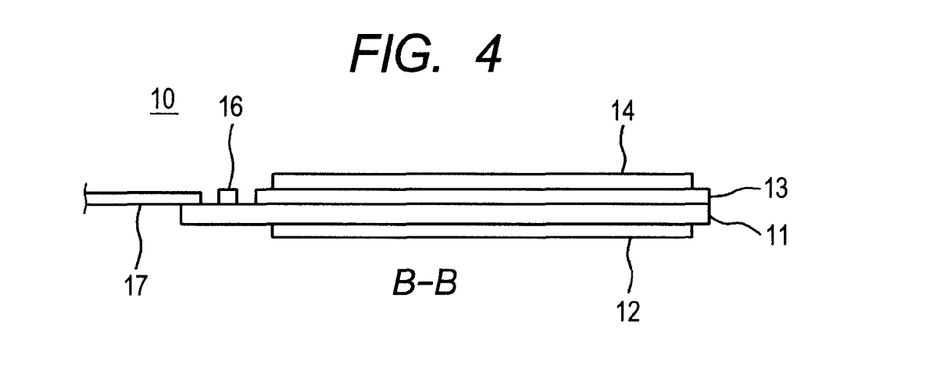
FIG. 4 is a sectional view taken along line B-B of FIG. 3.

FIG. 3 is a plan view of the liquid crystal display panel 10 shown in FIG. 1. FIG. 4 is a sectional view taken along line B-B of FIG. 3. Referring to FIGS. 3 and 4, pixel electrodes and TFT are formed on the TFT substrate 11 while being arranged in matrix. A color filter is formed on the opposing substrate 13 corresponding to the pixel electrode formed on the TFT substrate 11. A liquid crystal layer (not shown) is interposed between the TFT substrate 11 and the opposing substrate 13. The liquid crystal layer serves to control light rays from the backlight and the like for each pixel so as to form an image. The liquid crystal is capable of controlling only polarized light. The liquid crystal layer controls the light from the backlight, which has been polarized by the lower polarizing plate 12. It is then polarized by the upper polarizing plate 14 attached to the opposing substrate 13 again so that the image can be visually confirmed by a human.

Referring to FIGS. 3 and 4, the TFT substrate 11 and the opposing substrate 13 are adhered at the respective peripheral parts via a seal material. A display region of the liquid crystal display panel 10 is substantially the same as that of the upper polarizing plate 14. The TFT substrate 11 is formed to be larger than the opposing substrate 13. A terminal portion 15 is formed on an extended portion of the TFT substrate 11. An IC driver 16 for driving the liquid crystal display panel 10 is mounted on the terminal portion 15. The terminal portion 15 is connected to a flexible wiring substrate 17 for externally supplying power, video signals, and scan signals to the liquid crystal display panel 10.

Figure 5:
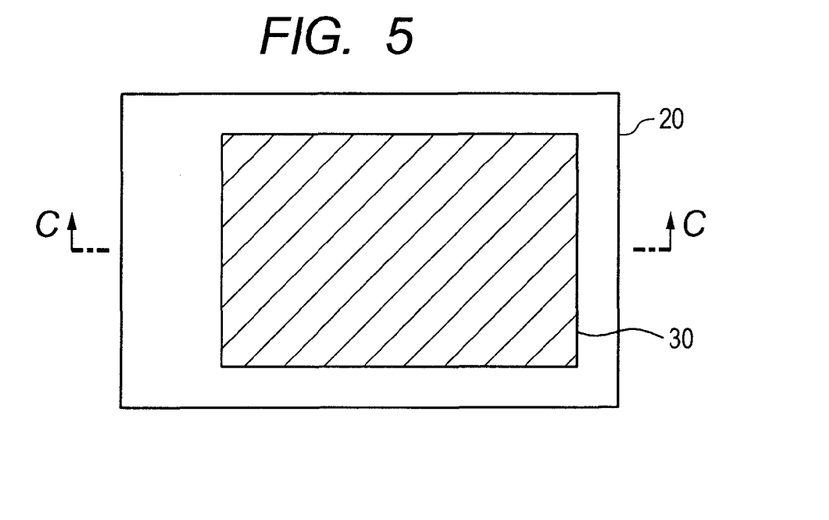
FIG. 5 is a plan view of a front window to which an ultraviolet curable resin is applied.
Figure 6:
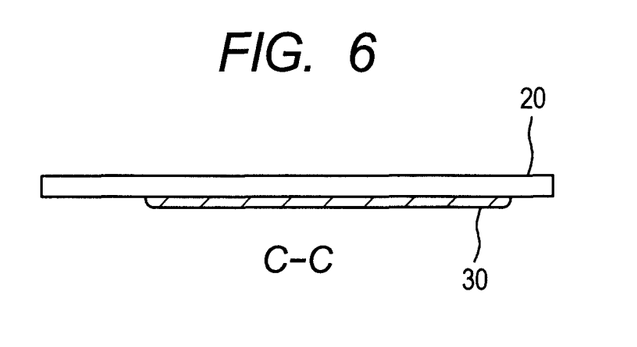
FIG. 6 is a sectional view taken along line C-C of FIG. 5.

FIG. 5 is a plan view of the front window 20 which is adhered to the liquid crystal display panel 10. FIG. 6 is a sectional view taken along line C-C of FIG. 5. The front window 20 may be formed of a plastic plate such as an acrylic plate and a polycarbonate plate. Alternatively, it may be formed of a glass material. In the embodiment, the front window 20 is formed of the glass material. Referring to FIG. 5, the ultraviolet curable resin 30 is applied to a back surface of the front window 20 using a dispenser. The ultraviolet curable resin 30 is applied while being linearly discharged from the dispenser in a reciprocating manner so that the applied position is changed.

The discharge amount of the ultraviolet curable resin 30 from the dispenser is accurately controlled to prevent generation of bubbles after adhering the liquid crystal display panel 10 and the front window 20, or extrusion of the resin. The discharge amount of the ultraviolet curable resin 30 from the dispenser may be set to 0.2 g, for example if the diagonal size of the display region is 3 inches. In this case, the discharge amount may be controlled to be in the range of ±0.01 g.

Referring to FIGS. 5 and 6, the amount of the ultraviolet curable resin 30 applied from the dispenser is accurately controlled. However, the applied area, the applied thickness and the like cannot be accurately controlled. FIG. 5 shows an approximate applied area of the ultraviolet curable resin 30 which has been wet and spread. The area and the applied thickness of the ultraviolet curable resin 30 will be described later. In a first ultraviolet irradiation process in the attachment device, those values are temporarily set, and fixed in a second ultraviolet curable irradiation process after removing the combined structure from the attachment device and left standing for a predetermined time period.

Referring to FIGS. 5 and 6, the ultraviolet curable resin 30 is applied to the upper side of the front window 20 using the dispenser, which is then inverted. Viscosity of the ultraviolet curable resin 30 is initially set to approximately 2300 mPa·sec. so that the uncured ultraviolet curable resin 30 does not drip off when inverting the front window 20.

The ultraviolet curable resin 30 exhibits a predetermined elastic property even after it is cured, and therefore serves to alleviate the impact exerted to the liquid crystal display device. The ultraviolet curable resin 30 is formed of the acrylic resin. For example, such product as SVR 1240H commercially available from Sony Chemical & Information Device Corporation may be employed. The SVR1240H exhibits both an ultraviolet curable property and a thermosetting property. The adhesive material will be described as the ultraviolet curable resin 30 hereinafter. However, the resin which exhibits both the ultraviolet curable property and the thermosetting property may be employed. It is to be noted that the ultraviolet curable property is indispensable.

Figure 7:
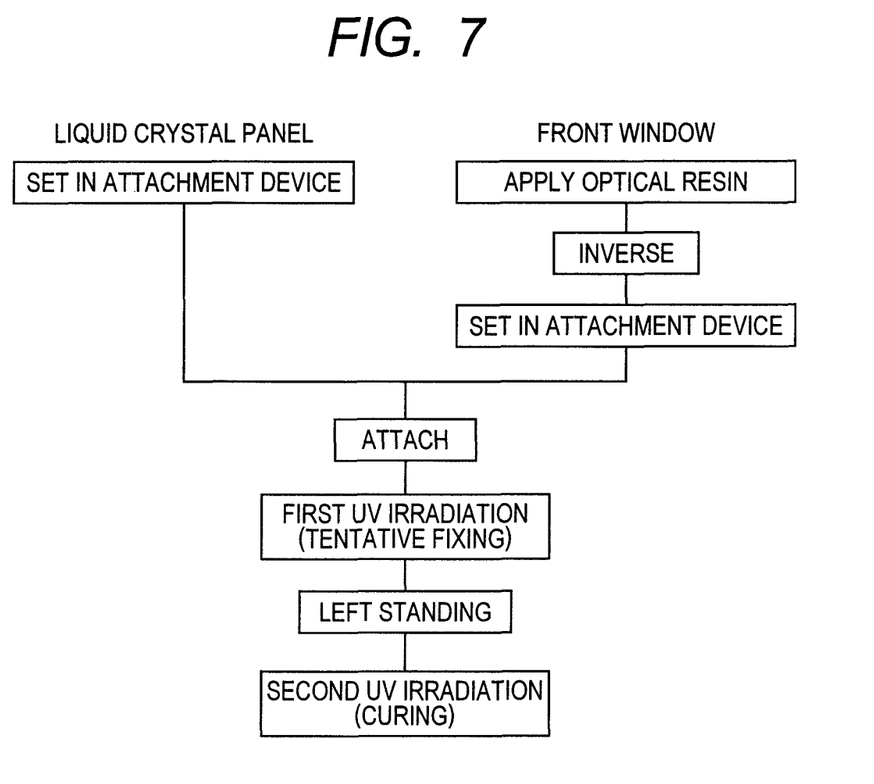
FIG. 7 is a flowchart representing an adhering process according to the present invention.

The thus formed liquid crystal display panel 10 and the front window 20 are adhered through the adhering process represented by FIG. 7. Referring to FIG. 7, the liquid crystal display panel 10 having the process of connecting the flexible wiring substrate 17 completed is set in the attachment device. Meanwhile, the ultraviolet curable resin 30 is applied to the front window 20 using the dispenser, and then the front window 20 is inverted so as to be set in the attachment device.

There may be the case of poor wettability of the ultraviolet curable resin 30 depending on the material for forming the front window 20 or its stained state. In such a case, Deep-UV irradiation is applied to the surface of the front window 20 for purification before application of the ultraviolet curable resin 30. Irradiation of Deep-UV as the ultraviolet light with short wavelength serves to decompose the contaminant adhered onto the surface of the front window 20 which will be removed as carbon dioxide gas.

Figure 8:
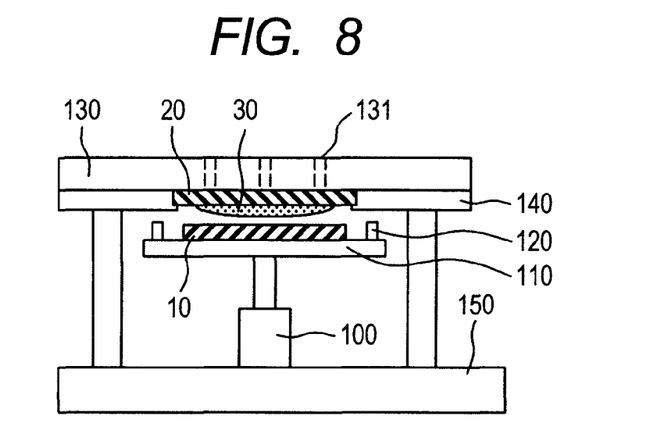
FIG. 8 is a schematic sectional view of the liquid crystal display panel and the front window which are set in an attachment device.
Figure 9:
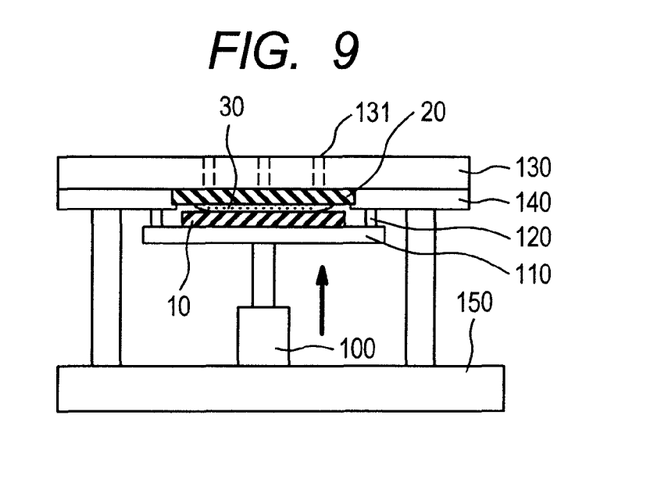
FIG. 9 is a schematic sectional view of the liquid crystal display panel and the front window which are set in the attachment device to be controlled apart from each other by a predetermined distance using a stopper.
Figure 10:
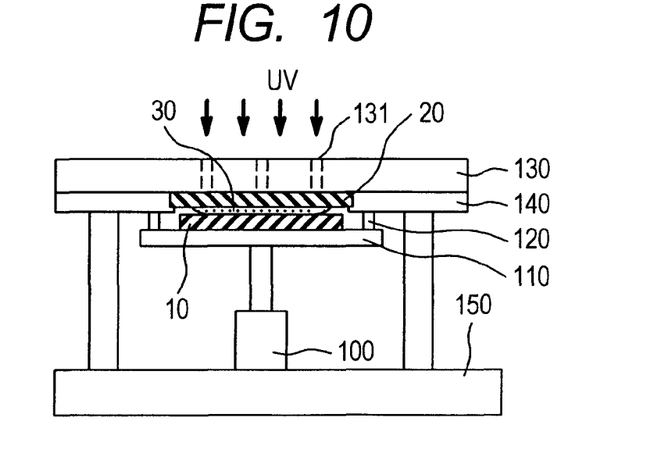
FIG. 10 is a view showing ultraviolet irradiation for temporarily curing a part of the ultraviolet curable resin in the attachment device.

FIG. 8 is a sectional view schematically illustrating the liquid crystal display panel 10 and the front window 20 which are set in the attachment device. In the attachment device shown in FIG. 8, the front window 20 is set on an upper support mechanism 140 while having the adhesion surface directed downward. The liquid crystal display panel 10 is set on a lower support mechanism 110 which is moved up and down by a cylinder 100 attached to a base 150. A stopper 120 is attached to the lower support mechanism 110, which determines the distance between the front window 20 and the liquid crystal display panel 10, that is, the thickness of the ultraviolet curable resin 30. Referring to FIGS. 8 to 10, the stopper 120 is attached to the lower support mechanism 110. However, it may be attached to the upper support mechanism 140.

Referring to FIG. 8, an ultraviolet irradiation mask 130 is provided on the front window 20. The ultraviolet irradiation mask 130 has a transmission pattern which allows ultraviolet transmission at a specific point so that the ultraviolet light is irradiated to a part of the ultraviolet curable resin 30. The transmission pattern may be formed as holes in the ultraviolet irradiation mask 130.

In the aforementioned state, the cylinder 100 illustrated in FIG. 8 is lifted up to adhere the liquid crystal display panel 10 and the front window 20 via the ultraviolet curable resin 30. This is the attachment process as represented by FIG. 7. The state of such process is illustrated in FIG. 9. FIG. 9 is a sectional view schematically showing the attachment process. Referring to FIG. 9, the lower support mechanism 110 is lifted up by the cylinder 100 until the stopper 120 attached to the lower support mechanism 110 is brought into contact with the upper support mechanism 140. The stopper 120 serves to accurately determine the distance between the upper support mechanism 140 and the lower support mechanism 110, and simultaneously, the distance between the front window 20 set on the upper support mechanism 140 and the liquid crystal display panel 10 set on the lower support mechanism 110. The stopper is attached to the lower support mechanism. However, it may be attached to the upper support mechanism, or both the upper and the lower support mechanisms.

In this state, the first ultraviolet irradiation is performed as shown in FIG. 10. This is the first UV irradiation (tentative fixing) process as shown in FIG. 7. Referring to FIG. 10, since the ultraviolet light is irradiated through the ultraviolet irradiation mask 130, it is irradiated to the ultraviolet curable resin 30 only through ultraviolet transmission pattern 131 formed in the ultraviolet irradiation mask 130. Then the part of the ultraviolet curable resin 30 corresponding to the ultraviolet transmission pattern 131 is only temporarily cured. The rest of the part keeps predetermined flowability. Even if the ultraviolet curable resin 30 is partially and temporarily cured, the ultraviolet curable resin 30 as a whole is capable of flowing to establish the uniform film thickness and discharging bubbles.

Figure 11:
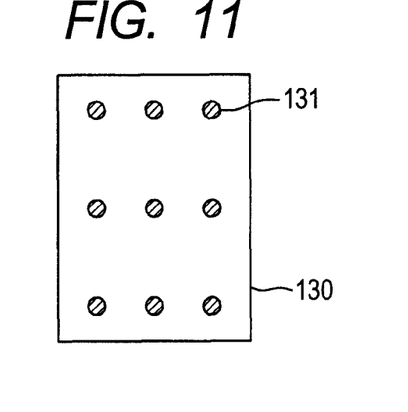
FIG. 11 illustrates an example of an ultraviolet irradiation mask.
Figure 12:
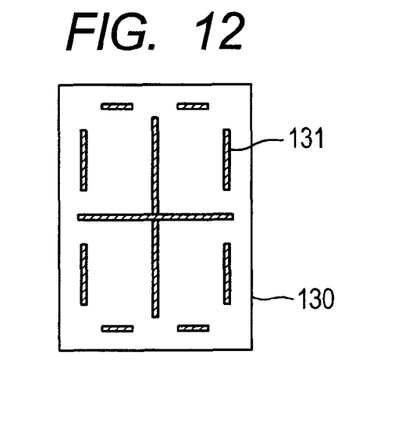
FIG. 12 illustrates another example of the ultraviolet irradiation mask.
Figure 13:
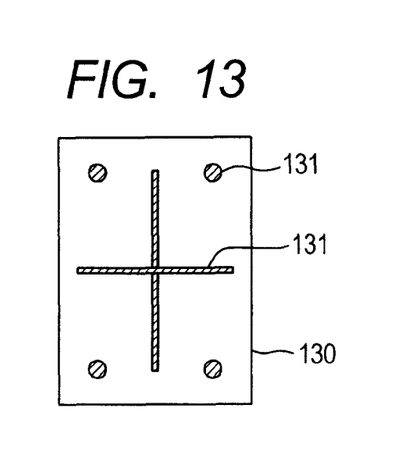
FIG. 13 illustrates still another example of the ultraviolet irradiation mask.

FIGS. 11 to 13 show examples of the ultraviolet transmission pattern 131 formed in the ultraviolet irradiation mask 130. Referring to FIGS. 11 to 13, the ultraviolet light is expected to transmit the shaded parts. In FIG. 11, nine circular holes are formed as the ultraviolet transmission patterns 131. The ultraviolet curable resin 30 will be temporarily cured to form a cylindrical shape corresponding to the nine circular parts. Referring to FIG. 11, there are nine ultraviolet transmission patterns 131. If the liquid crystal display panel 10 has a small area, four patterns formed at diagonal circumferential points will be sufficient. If the number of the parts to be temporarily cured is small, it is more effective to set the parts to be temporarily cured at the circumferential portions.

FIG. 12 shows the patterns as linear parts to be temporarily cured. Referring to FIG. 12, a cross-shaped part and the peripheral linear parts to be temporarily cured are formed to enclose the uncured ultraviolet curable resin 30. Such pattern is effective when the viscosity of the uncured ultraviolet curable resin 30 is relatively low. FIG. 13 shows the patterns formed by combining the linear ultraviolet transmission patterns 131 and circular ultraviolet transmission patterns 131. In this way, the ultraviolet transmission pattern 131 may take various forms depending on the viscosity of the ultraviolet curable resin 30, the area of the liquid crystal display panel 10 and the like. The use of the mask is not necessarily required. The ultraviolet irradiation may be applied to the spot corresponding to the ultraviolet transmission pattern as described above without using the mask.

The ultraviolet light for temporarily curing the resin as shown in FIG. 10 requires energy ranging from 500 mJ to 1000 mJ. In the case of the ultraviolet light at 100 W, the ultraviolet irradiation for 5 to 10 seconds may be sufficient in the aforementioned case. That is, the state shown in FIG. 10 is kept for 5 to 10 seconds, and thereafter, the liquid crystal display device having the front window 20 and the liquid crystal display panel 10 temporarily adhered may be taken from the attachment device. The time period for each liquid crystal display device to occupy the attachment device is so short that the operation rate of the device is improved.

Referring back to FIG. 7, the thus temporarily adhered front window 20 and the liquid crystal display panel 10 are taken from the attachment device, and left standing on the tray. While it is left standing, the uncured ultraviolet curable resin 30 keeps the flowability, and therefore flows to achieve an optimum thickness of the ultraviolet curable resin 30. Even if bubbles are generated in the ultraviolet curable resin 30, they may be diffused outside so far as the ultraviolet curable resin 30 exhibits the flowability.

While it is left standing, the ultraviolet curable resin 30 flows again, and has the predetermined thickness and the predetermined area. The final area of the ultraviolet curable resin 30 becomes substantially the same as that of the upper polarizing plate 14. The time for leaving the structure standing is approximately 30 minutes. As it is left on the tray and the like, the operation rate of the attachment device will not be deteriorated.

After an elapse of the predetermined time period for being left standing, the second ultraviolet irradiation is applied to finally cure the resin from the front window 20 of the liquid crystal display device. At this time, since the ultraviolet irradiation mask 130 has already been removed, the second ultraviolet irradiation is applied over the entire surface of the front window 20. In this way, the front window 20 and the liquid crystal display panel 10 are adhered to finish manufacturing the liquid crystal display device.

As described above, according to the embodiment, the portion between the liquid crystal display panel 10 and the front window 20 is partially and temporarily cured through the first ultraviolet irradiation. Thereafter, they are taken from the device and left standing. The second ultraviolet irradiation is then applied for final curing, thus improving the operation rate of the device. The stopper 120 of the attachment device serves to accurately set the distance between the front window 20 and the liquid crystal display panel 10, both of which are left standing to control both thickness and area of the ultraviolet curable resin 30 between the front window 20 and the liquid crystal display panel 10 through self-alignment. This makes it possible to accurately form a layer of the ultraviolet curable resin 30 between the front window 20 and the liquid crystal display panel 10.

The attachment device as described referring to FIGS. 8 to 10 allows the stopper 120 attached to the lower support mechanism 110 to set the distance between the front window 20 and the liquid crystal display panel 10. Alternatively, the attachment device is capable of setting the distance between the front window 20 and the liquid crystal display panel 10 using another method without the stopper 120. For example, the attachment device shown in FIGS. 14 to 16 moves the lower support mechanism 110 up and down using a stepping motor 200 instead of the cylinder 100. The stepping motor 200 is capable of accurately controlling the moving distance of the lower support mechanism 110. This makes it possible to accurately set the position of the lower support mechanism 110, that is, the distance between the liquid crystal display panel 10 and the front window 20 without the stopper 120.

Figure 14:
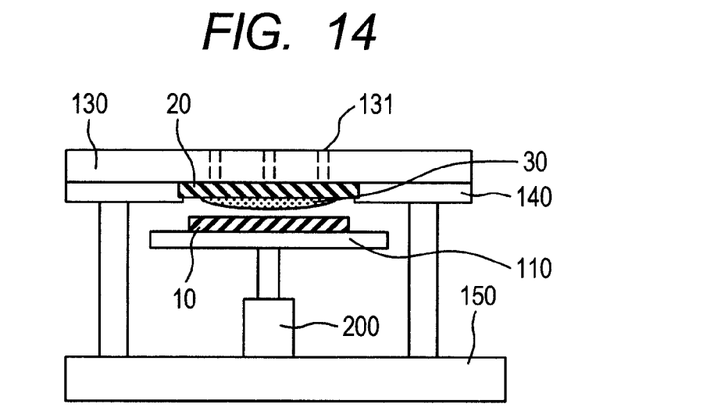
FIG. 14 is a schematic sectional view of the liquid crystal display panel and the front window which are set to be apart from each other by a predetermined distance in another attachment device.
Figure 15:
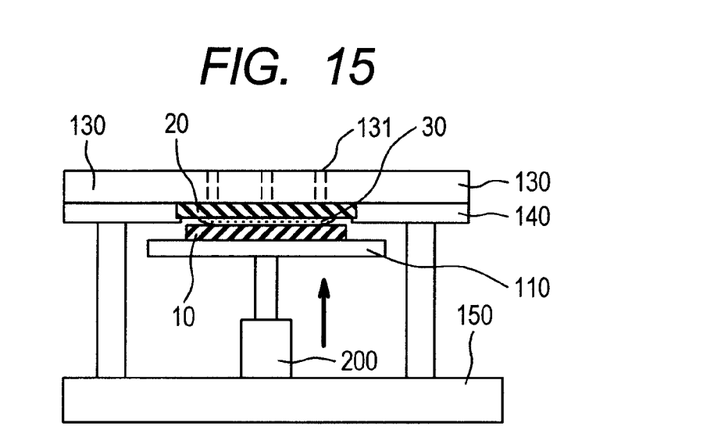
FIG. 15 is a view of another attachment device which allows a stepping motor to set a distance between the liquid crystal display panel and the front window.
Figure 16:
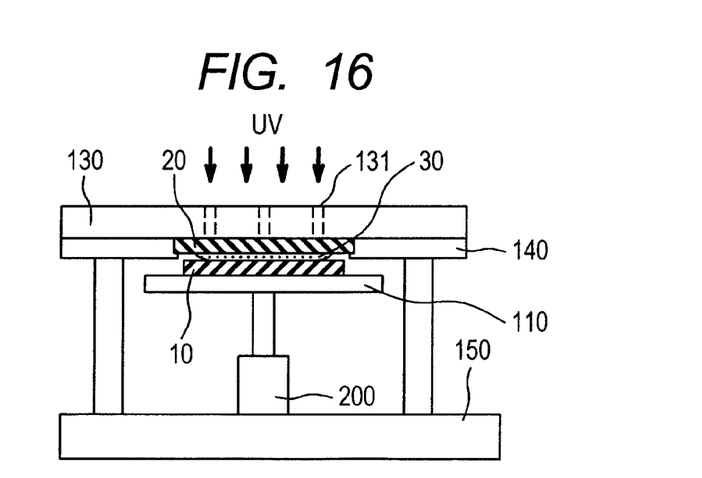
FIG. 16 illustrates ultraviolet irradiation for temporarily curing a part of the ultraviolet curable resin in another attachment device.

Referring to FIGS. 14 to 16, instead of the cylinder 100, the stepping motor 200 is used for moving the lower support mechanism 110 up and down in the attachment device shown in FIGS. 8 to 10. The feature shown in FIGS. 14 to 16 is different from the feature shown in FIGS. 8 to 10 in that the stepping motor 200 is used for moving the lower support mechanism 110. Other functions and processes are the same, and explanations thereof, thus, will be omitted.

Referring to FIGS. 14 to 16, the stepping motor 200 moves the lower support mechanism 110 up and down. However, the stepping motor 200 may be structured to move the upper support mechanism 140 up and down to set the distance between the liquid crystal display panel 10 and the front window 20. In such a case, the lower support mechanism 110 is fixed, and the upper support mechanism 140 is moved up and down by the stepping motor 200.

As described above, the ultraviolet curable resin 30 is applied to the front window 20. However, it may be applied to the upper polarizing plate 14 of the liquid crystal display panel 10. In this case, the aforementioned process may be used with no need of modification, and the ultraviolet irradiation is applied preferably to the side of the front window 20 rather than the side of the liquid crystal display panel 10. This is because of difficulty to uniformly irradiate the ultraviolet light to the liquid crystal display panel 10 on which opaque wirings such as the scan signal line and the video signal line are formed.

[Second Embodiment]

Figure 17:
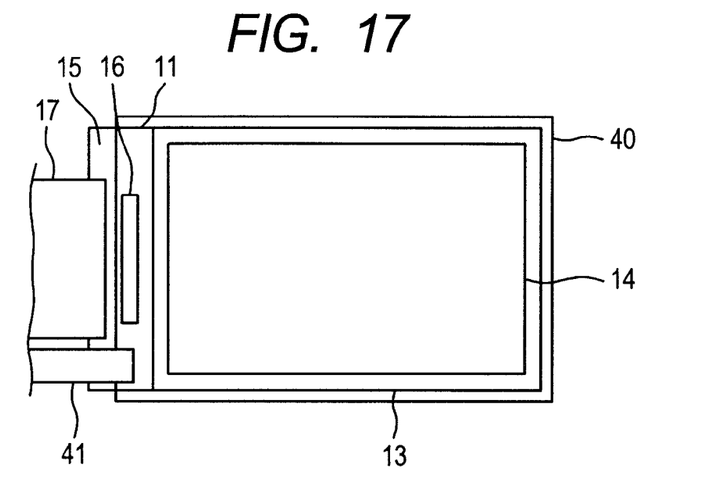
FIG. 17 is a plan view of a liquid crystal display device according to a second embodiment.
Figure 18:
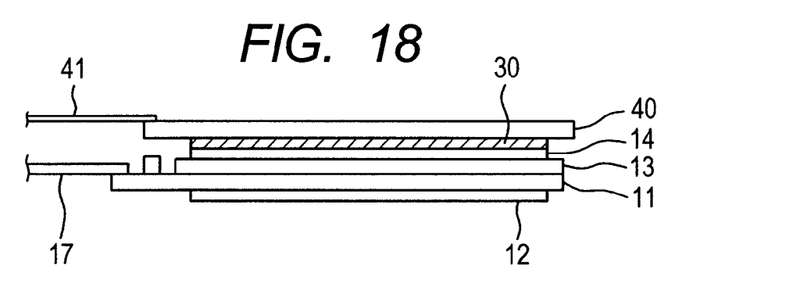
FIG. 18 is a sectional view of the liquid crystal display device according to the second embodiment.

FIGS. 17 and 18 are plan view and sectional view of a liquid crystal display module formed of the liquid crystal display panel and a touch panel according to a second embodiment of the present invention. Referring to FIGS. 17 and 18, a touch panel 40 is provided on the liquid crystal display panel 10. The upper polarizing panel 14 of the liquid crystal display panel 10 and the touch panel 40 are adhered via the ultraviolet curable resin 30.

Figure 19:
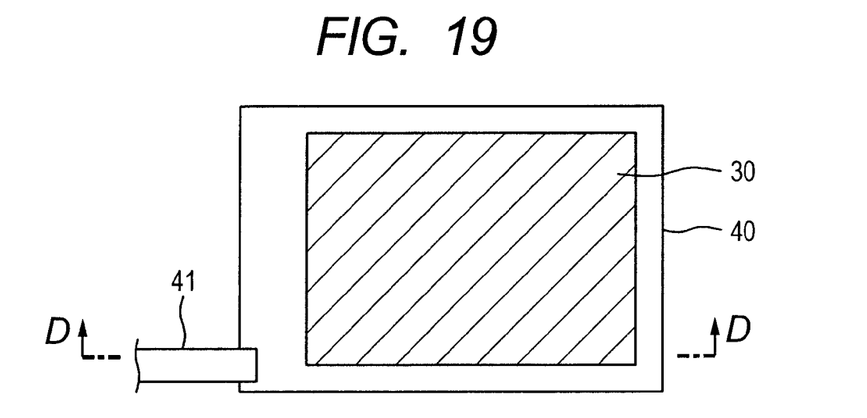
FIG. 19 is a plan view of a touch panel to which the ultraviolet curable resin is applied.
Figure 20:
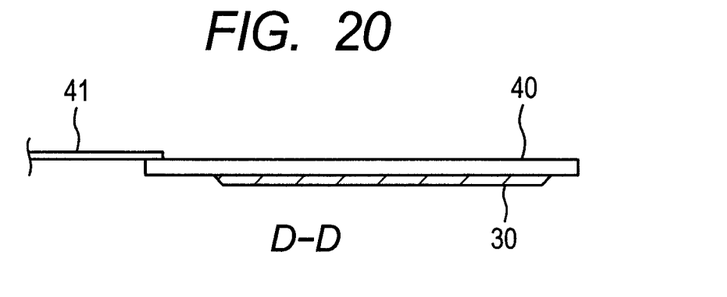
FIG. 20 is a sectional view taken along line D-D of FIG. 19.

FIG. 19 is a plan view of the touch panel 40, and FIG. 20 is a sectional view taken along line D-D of FIG. 19. Referring to FIGS. 19 and 20, the touch panel 40 is connected to a flexible wiring substrate 41 for the touch panel 40. As shown in FIG. 19, like the front window 20 according to the first embodiment shown in FIG. 5, the ultraviolet curable resin 30 is applied to the touch panel 40 using the dispenser. Like the first embodiment, the ultraviolet curable resin 30 is applied to the touch panel 40 directed upward, and then inverted as shown in FIG. 20.

The touch panel 40 may be of static type or resistance type. Especially the resistance type mostly has the wiring formed at the inner side using two substrates. In the case where the thus structured touch panel 40 is adhered to the liquid crystal display panel 10 in the reduced pressure atmosphere, the touch panel 40 is inflated by air therein, thus preventing accurate adhesion. The adhering method according to the present invention may be conducted in the atmosphere, which is useful especially for the embodiment.

The touch panel 40 shown in FIGS. 19 and 20 is adhered to the liquid crystal display panel 10 shown in FIGS. 3 and 4. This adhering method is substantially the same as that of the first embodiment except the use of the touch panel 40 instead of the front window 20. Explanations of the other features thus will be omitted. The second embodiment makes it possible to accurately adhere the liquid crystal display panel 10 and the touch panel 40 efficiently using the ultraviolet resin.

[Third Embodiment]

Figure 21:
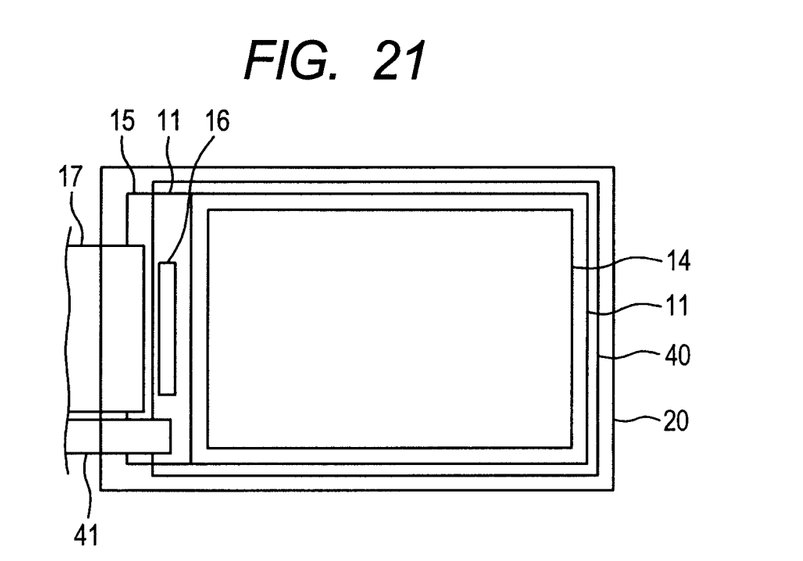
FIG. 21 is a plan view of a liquid crystal display device according to a third embodiment.
Figure 22:
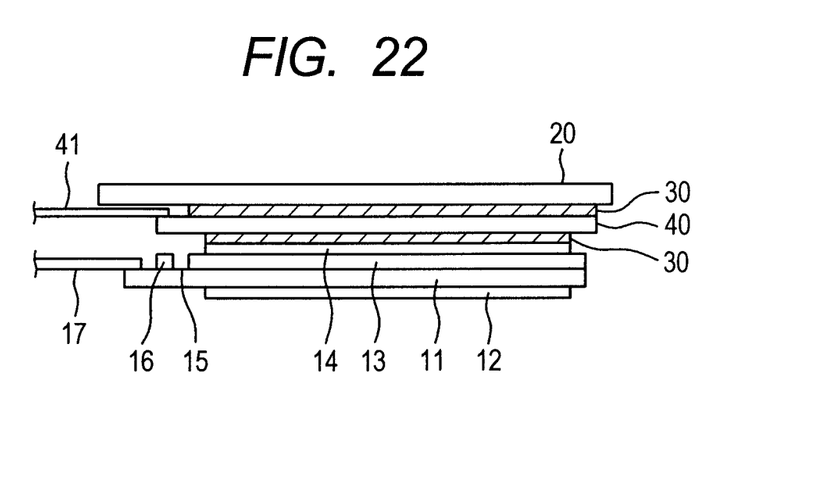
FIG. 22 is a sectional view of the liquid crystal display device according to the third embodiment.

FIGS. 21 and 22 are plan view and sectional view of the liquid crystal display device with a front window according to a third embodiment of the present invention. Referring to FIGS. 21 and 22, the touch panel 40 is provided on the liquid crystal display panel 10 to form the liquid crystal module. The front window 20 is provided on the touch panel 40. The upper polarizing plate 14 of the liquid crystal display panel 10 and the touch panel 40 are adhered via the ultraviolet curable resin 30. The touch panel 40 and the front window 20 are adhered via the ultraviolet curable resin 30.

Referring to FIGS. 21 and 22, the front window 20 and the touch panel 40 are adhered via the ultraviolet curable resin 30. As in the first embodiment shown in FIGS. 5 and 6, the ultraviolet curable resin 30 is applied to the front window 20 using the dispenser. The front window 20 to which the ultraviolet curable resin 30 is applied and the touch panel 40 are adhered in the same process according to the first embodiment as shown in FIG. 7.

Referring to FIG. 7, the touch panel 40 is provided instead of the liquid crystal display panel 10. Referring to FIGS. 8 to 10, the front window 20 and the touch panel 40 are adhered in the same way as adhesion of the front window 20 and the liquid crystal display panel 10 according to the first embodiment except that the touch panel 40 is provided on the lower support mechanism 110 instead of the liquid crystal display panel 10.

As described above, the ultraviolet curable resin 30 is applied to the side of the front window 20 using the dispenser. However, the ultraviolet curable resin 30 may be applied to the side of the touch panel 40 using the dispenser. Preferably, the ultraviolet irradiation is applied to the side of the front window 20. However, it may be applied to the side of the touch panel 40.

In this way, the combined structure of the front window 20 and the touch panel 40 through adhesion via the ultraviolet curable resin 30 is adhered to the liquid crystal display panel 10 in the same process according to the first embodiment as shown in FIG. 7. Referring to FIG. 7, the combined structure of the front window 20 and the touch panel 40 is provided instead of the front window 20. Referring to FIGS. 8 to 10, instead of the front window 20, the combined structure of the front window 20 and the touch panel 40 is provided on the upper support mechanism 140. Beside the aforementioned feature, the combined structure of the front window 20 and the touch panel 40 is adhered to the liquid crystal display panel 10 in the same way as the adhesion of the front window 20 and the liquid crystal display panel 10 according to the first embodiment.

Two locations between the front window 20 and the touch panel 40, and the touch panel 40 and the liquid crystal display panel 10 are adhered via the ultraviolet curable resin 30. In the present invention, the adhesion may be performed in the atmosphere without using the pressure reduction process, and having no need of occupying the attachment device for a long time period. This is especially effective for reducing the time for executing the adhering process, the device cost, and improving the operation rate of the device. In the embodiment, the liquid crystal display panel 10 is combined with the drive circuit such as the driver IC and the backlight, and further the touch panel to form the liquid crystal module. The front window 20 is further additionally attached to the liquid crystal display panel or the liquid crystal display module to form the liquid crystal display device with a front window.

According to the present invention, the first ultraviolet irradiation is applied to temporarily cure a part of the ultraviolet curable resin 30, and after an elapse of a predetermined time period, the second ultraviolet irradiation is applied to finalize curing of the ultraviolet curable resin 30 entirely. The part temporarily cured by the first ultraviolet irradiation and the rest of the part are different in the cross-linking state, stress and intensity of the resin.

For example, if the stress exerted to the liquid crystal display panel 10 by the ultraviolet curable resin 30 is different between the temporarily cured part and the rest of the part, there may be the difference in the transmission factor of the liquid crystal display panel 10. That is, in most of the case, the thickness of the liquid crystal display panel 10 is reduced through grinding. In such a case, the gap between the TFT substrate 11 and the opposing substrate 13 of the liquid crystal display panel 10 is partially changed owing to the difference of stress exerted by the resin. The partial change in the gap may cause a very small difference in the transmission factor, and more specifically, the partial difference in chromaticity.

The aforementioned coloring phenomenon does not occur at around the normal temperature. It is not observed even at around 40° C. Meanwhile, in the case where the liquid crystal display device is heated to the temperature at around 70° C., the slight coloring phenomenon is observed. Assuming that the part of the display panel of the display device with a front window according to the embodiment, on which the ultraviolet curable resin is applied, is set as the first region, the first region includes a second region like an island where the temporary curing is performed using the mask as described above. The cross-linking state, intensity, and the transmission factor of the resin in the second region are different from those of the first region.

What is claimed is:

1. A method of manufacturing a display device with a front window formed by adhering a front window and a display panel via an ultraviolet curable resin, comprising the steps of:
   forming the ultraviolet curable resin on one of the front window and the display panel;
   setting the display panel on a first support mechanism of an attachment device, and setting the front window on a second support mechanism of the attachment device so that the front window is positioned opposite the display panel;
   attaching a stopper to one of the first and second support mechanisms so as to set a predetermined distance between the front window and the display panel via the ultraviolet curable resin when the stopper is moved to a position contacting the other of the first and second support mechanism;
   temporarily curing a part of the ultraviolet curable resin by partially irradiating ultraviolet light to the front window and leaving the temporarily curing ultraviolet curing resin standing for a predetermined time period; and
   finalizing curing of the ultraviolet curing resin by irradiating the ultraviolet light to the front window to adhere the front window and the display panel.

2. The method of manufacturing a display device with a front window according to claim 1, wherein the temporary curing is performed by irradiating the ultraviolet light via an ultraviolet irradiation mask.

3. The method of manufacturing a display device with a front window according to claim 2, wherein the temporarily curing and the finalizing curing are performed in atmosphere.

4. The method of manufacturing a display device with a front window according to claim 1, wherein the stopper is attached to the one of the first and second support mechanisms so as to contact with the other of the first and second support mechanisms without contacting a surface of the front window and a surface of the display panel which are positioned opposite one another.

5. A method of manufacturing a display device with a front window formed by adhering a display module with an integrated structure of a display panel and a touch panel to a front window via an ultraviolet curable resin, comprising the steps of:
   forming the ultraviolet curable resin on one of the front window and the display module;

setting the display module on a first support mechanism of an attachment device, and setting the front window on a second support mechanism of the attachment device so that the front window is positioned opposite the display module;

attaching a stopper to one of the first and second support mechanisms so as to set a predetermined distance between the front window and the display module via the ultraviolet curable resin when the stopper is moved to a position contacting the other of the first and second support mechanism;

temporarily curing a part of the ultraviolet curable resin by partially irradiating ultraviolet light to the front window and leaving the temporarily curing ultraviolet curable resin standing for a predetermined time; and finalizing curing of the ultraviolet curing resin by irradiating the ultraviolet light to the front window to adhere the front window and the display module.

6. The method of manufacturing a display device with a front window according to claim 5, wherein the temporary curing is performed by irradiating the ultraviolet light via an ultraviolet irradiation mask.

7. The method of manufacturing a display device with a front window according to claim 6, wherein the temporarily curing and the finalizing curing are performed in atmosphere.

8. The method of manufacturing a display device with a front window according to claim 5, wherein the stopper is attached to the one of the first and second support mechanisms so as to contact with the other of the first and second support mechanisms without contacting a surface of the front window and a surface of the display module which are positioned opposite one another.

\* \* \* \* \*